United States Patent
Serpa et al.

(10) Patent No.: US 7,342,895 B2
(45) Date of Patent: Mar. 11, 2008

(54) METHOD AND SYSTEM FOR PEER-TO-PEER WIRELESS COMMUNICATION OVER UNLICENSED COMMUNICATION SPECTRUM

(75) Inventors: Mark Serpa, 32 Shooting Star, Irvine, CA (US) 92604; Hani Alhemsi, Westminster, CA (US); Greg Ratajski, Santa Ana, CA (US); Bob Ashlock, Fullerton, CA (US)

(73) Assignee: Mark Serpa, Irvine, CA (US)

( * ) Notice: Subject to any disclaimer, the term of this patent is extended or adjusted under 35 U.S.C. 154(b) by 848 days.

(21) Appl. No.: 10/766,877

(22) Filed: Jan. 30, 2004

(65) Prior Publication Data

US 2005/0169219 A1    Aug. 4, 2005

(51) Int. Cl.
*H04L 12/28* (2006.01)
*H04B 7/00* (2006.01)

(52) U.S. Cl. ............... 370/254; 370/310; 455/41.2

(58) Field of Classification Search ........ 370/254, 370/310, 431, 445; 455/41.2; 726/2, 3, 726/4, 16, 17, 21
See application file for complete search history.

(56) References Cited

U.S. PATENT DOCUMENTS

| | | | |
|---|---|---|---|
| 5,537,415 A | 7/1996 | Miller et al. | 370/314 |
| 5,682,142 A | 10/1997 | Loosmore et al. | 340/572.1 |
| 5,691,980 A | 11/1997 | Welles, II et al. | 370/316 |
| 5,729,196 A | 3/1998 | Aljadeff et al. | 340/505 |
| 5,898,831 A | 4/1999 | Hall et al. | 726/3 |
| 6,069,896 A | 5/2000 | Borgstahl et al. | 370/401 |
| 6,104,333 A | 8/2000 | Wood, Jr. | 341/173 |
| 6,344,794 B1 | 2/2002 | Ulrich et al. | 340/539.16 |
| 6,351,221 B1 | 2/2002 | Phillips et al. | 340/825.49 |
| 6,424,623 B1 | 7/2002 | Borgstahl et al. | 370/230 |
| 6,434,158 B1 | 8/2002 | Harris et al. | 370/401 |
| 6,480,143 B1 | 11/2002 | Kurger et al. | 342/44 |
| 6,483,426 B1 | 11/2002 | Pagnol et al. | 340/10.1 |
| 6,487,180 B1 | 11/2002 | Borgstahl et al. | 370/310 |
| 7,164,885 B2 * | 1/2007 | Jonsson et al. | 455/41.2 |
| 2002/0114350 A1 | 8/2002 | Tang et al. | 370/469 |

(Continued)

FOREIGN PATENT DOCUMENTS

FR       2 573 593       5/1986

(Continued)

OTHER PUBLICATIONS

Radio Equipment And Systems (RES); Digital European Cordless Telecommunications (DECT) Common Interface (1992) "DECT, The Standard Explained", DECT Forum, Feb. 1997.

(Continued)

*Primary Examiner*—Hassan Kizou
*Assistant Examiner*—Betty Lee
(74) *Attorney, Agent, or Firm*—McDermott Will & Emery LLP

(57) ABSTRACT

The present invention provides a method and system for peer-to-peer wireless communication over an unlicensed communication spectrum without routing or relaying of messages. Low-cost wireless communication is made possible by providing direct, peer-to-peer wireless communication without a need for extensive infrastructure as well as by utilizing unlicensed communication spectrums. Communication utility is afforded by enabling wireless communication over a medium-range distance, and by implementing a collision avoidance protocol.

32 Claims, 14 Drawing Sheets

U.S. PATENT DOCUMENTS

| | | | |
|---|---|---|---|
| 2002/0169539 A1 | 11/2002 | Menard et al. | 360/323 |
| 2003/0083045 A1 | 5/2003 | Mathis | 455/412.1 |
| 2003/0126213 A1* | 7/2003 | Betzler | 709/206 |
| 2004/0106408 A1* | 6/2004 | Beasley et al. | 455/436 |
| 2004/0249953 A1* | 12/2004 | Fernandez et al. | 709/227 |
| 2005/0058084 A1* | 3/2005 | Hester et al. | 370/254 |
| 2005/0113118 A1* | 5/2005 | Klassen et al. | 455/466 |
| 2005/0117525 A1* | 6/2005 | Poustchi et al. | 370/254 |
| 2005/0136901 A1* | 6/2005 | Jung et al. | 455/415 |

FOREIGN PATENT DOCUMENTS

| | | |
|---|---|---|
| FR | 2 615 957 | 12/1988 |
| GB | 2 363 943 | 1/2002 |
| WO | WO 00/22860 | 4/2000 |
| WO | WO 03/049326 | 6/2003 |

OTHER PUBLICATIONS

"Mobile Ad Hoc Networking and The IETF", by Joseph P. Macker, et al., Mobile Computing and Communications Review, vol. 2, No. 4, pp. 9-13.

"A Performance Comparison of Multi-Hop Wireless Ad Hoc Network Routing Protocols", by Josh Broch, et al., Proceedings of the Fourth Annual ACM/IEEE International Conference on Mobile Computing and Networking (MobiCom'98), Oct. 25-30, 1998, Dallas, Texas.

"Mobile Ad Hoc Networking and The IEFT", by Joseph P. Macker, et al., Mobile Computing and Communications Review, vol. 2, No. 4, pp. 9-13, 1998.

"A Performance Comparison of Multi-Hop Wireless Ad Hoc Network Routing Protocols", by Josh Broch, et al., Proceedings of the Fourth Annual ACM/IEEE International Conference on Mobile Computing and Networking (MobiCom'98), Oct. 25-30, 1998, Dallas, Texas.

* cited by examiner

| Method name | Parameters | Description |
| --- | --- | --- |
| ServiceConnect | Destination ID, Service type | Opens a service connection to destination Buddy Finder for a specific service type. |
| ServiceClose | Service type | Closes currently open service connection. |
| Send | Data buffer, buffer length, transmission type. | Sends a data buffer with a specific length, the transmission type could be reliable or non reliable. |
| Receive | Data buffer, buffer length | Receives a buffer from the network with a specific buffer length |
| ServiceResult | Service type | Called by the network to notify the application for the last service operation result.<br>For ServiceConnect: it indicates if connection has successfully established.<br>For Send: It holds the result of sending the messages in reliable mode. |
| Broadcast | Service type, data buffer, buffer length | Used for broadcasting information to all peers within the range. |

| MSG LENGTH | MSG ID | POWER CONTROL | PEER A ID 1 | PEER A ID 2 | PEER A ID 3 | PEER A ID 4 | PEER B ID 1 | PEER B ID 2 | PEER B ID 3 | PEER B ID 4 | PEER A AUTH FLAG | SEQ ID 1 | SEQ ID 2 | FCS |
|---|---|---|---|---|---|---|---|---|---|---|---|---|---|---|

PROTOCOL VERSION

MESSAGE ID = 002 ← 910

| MSG LENGTH | MSG ID | POWER CONTROL | PEER B ID 1 | PEER B ID 2 | PEER B ID 3 | PEER B ID 4 | SEQ ID 1 | SEQ ID 2 | RESULT | FCS |
|---|---|---|---|---|---|---|---|---|---|---|

PROTOCOL VERSION

MESSAGE ID = 003 ← 1010

| MSG LENGTH | MSG ID | POWER CONTROL | PEER B ID 1 | PEER B ID 2 | PEER B ID 3 | PEER B ID 4 | PEER A ID 1 | PEER A ID 2 | PEER A ID 3 | PEER A ID 4 | SERVICE TYPE | SEQ ID 1 | SEQ ID 2 | FCS |
|---|---|---|---|---|---|---|---|---|---|---|---|---|---|---|

PROTOCOL VERSION

MESSAGE ID = 004 ← 1110

| MSG LENGTH | MSG ID | POWER CONTROL | PEER A ID 1 | PEER A ID 2 | PEER A ID 3 | PEER A ID 4 | SEQ ID 1 | SEQ ID 2 | RESULT | FCS |

PROTOCOL VERSION

MESSAGE ID = 005 — 1210

| MSG LENGTH | MSG ID | POWER CTRL | PEER B ID 1 | PEER B ID 2 | PEER B ID 3 | PEER B ID 4 | PEER A ID 1 | PEER A ID 2 | PEER A ID 3 | PEER A ID 4 | FLAGS | NO OF SEG | SEG NO | DATA 1 | DATA 2 | ... | DATA N | FCS |

PROTOCOL VERSION

MESSAGE ID = 006 — 1310

FIG. 14

| MSG LENGTH | MSG ID | POWER CTRL | PEER A ID 1 | PEER A ID 2 | PEER A ID 3 | PEER A ID 4 | PEER B ID 1 | PEER B ID 2 | PEER B ID 3 | PEER B ID 4 | NO OF SEG | SEG START NO | BIT map1 | BIT map2 | ... | BIT mapN | FCS |

PROTOCOL VERSION

MESSAGE ID = 007 — 1410

FIG. 15

| MSG LENGTH | MSG ID | POWER CTRL | PEER B ID 1 | PEER B ID 2 | PEER B ID 3 | PEER B ID 4 | PEER A ID 1 | PEER A ID 2 | PEER A ID 3 | PEER A ID 4 | SEQ ID 1 | SEQ ID 2 | FCS |

PROTOCOL VERSION

MESSAGE ID = 008 — 1510

METHOD AND SYSTEM FOR PEER-TO-PEER WIRELESS COMMUNICATION OVER UNLICENSED COMMUNICATION SPECTRUM

BACKGROUND OF THE INVENTION

1. Field of the Invention

The present invention relates generally to a method and system for wireless communication, and, more particularly, to a method and system for peer-to-peer wireless communication over an unlicensed communication spectrum without routing or relaying of messages.

2. Description of the Related Art

Wireless communication is one of the most rapidly developing areas of communication today. A number of technologies and devices such as the cell phones, pagers, PDAs, CDMA, Wi-Fi, and Bluetooth, are on the market enabling people to communicate without being tied to wires bound to stationary locations.

Among the existing wireless communication methodologies, technologies such as the cell phones, CDMA, and Wi-Fi require extensive infrastructure. For these technologies, wireless communication is possible only within the effective areas of infrastructure availability. In addition, infrastructure-based wireless communication services typically require paid subscription with considerable fees so that the service providers may recover substantial investments made in laying down the extensive infrastructure. Thus, much of the existing infrastructure-based wireless communication services may be beyond the reach of many users due to geographic and economic constraints or limitations. It can be seen, then, there exists a need for a method and system for low-cost wireless communication that does not require extensive infrastructure.

A method of communication that does not require extensive infrastructure is peer-to-peer communication. Well-known in the art, peer-to-peer communication involves direct communication between devices without the need for intermediaries. In particular, peer-to-peer wireless communication utilizing unlicensed spectrum can provide a basis for low-cost wireless communication, since there is no need to pay for spectrum licenses, in addition to having no need to invest in extensive infrastructure to serve as communication intermediaries.

A well-known technology that employs peer-to-peer wireless communication over an unlicensed spectrum is Bluetooth technology. See, Bluetooth Specification, version 1.0B, available at http://www.bluetooth.com. However, an important limitation of Bluetooth technology is the range of communication, which is a distance of 10 to 100 meters. Bluetooth is mainly intended for device to device communications, e.g., between a computer and a peripheral device such as a printer or a keyboard, and, hence, the operational range of 10 to 100 meters is quite sufficient. Limiting the operating range also allows Bluetooth to avoid a host of problems that must be addressed by peer-to-peer wireless communication in a wider area.

There are two basic problems that peer-to-peer wireless communication operating in a wider area (e.g., an area within a range of a few miles) must resolve. One is the issue of power, and the other is communication traffic collision and congestion. The intensity of radio signal decreases by the square of the distance from the point of origin. Thus, the transmitted power of a signal must increase by the square of the distance of operation as the operating range of radio communication is extended. Hence, wireless communication that covers a wider area must address the need of generating power which grows as the square of the range of operation. In addition, the wider the operating range, the more devices are likely to be within the area of operation, trying to communicate with one another. Thus, the problem of communication traffic collision and congestion is much more likely to be severe.

Bluetooth avoids both of these issues by limiting its range of operation to about 10 meters. This limitation, however, makes Bluetooth essentially useless for most personal communications, since there is no need to resort to electronic devices for people to communicate with each other within 10 meters. People can just talk to each other.

Known in the art is a wireless, peer-to-peer, capability addressable network as disclosed in U.S. Pat. No. 6,069,896 (the '896 patent). The '896 patent, however, is directed to and limited to "capability addressable network". In addition, the '896 patent discloses no collision avoidance mechanism. Thus, a wireless communication device in accordance with the '896 patent cannot provide effective communication when a multitude of devices are communicating within the same area at the same time. This means that the range of operation must be limited for the reasons discussed above. In reality, invention according to the teachings of the '896 patent cannot be effective beyond a few hundred meters. Furthermore, the '896 patent discloses no power conservation mechanism for peer-to-peer wireless communication. As discussed above, the power requirement and management problems are critical issues for medium to long range wireless communication.

Power management is particularly crucial issue for mobile or handheld wireless communication devices, since those devices typically operate on rechargeable or disposable batteries. A key issue in power management of mobile wireless communication devices is relaying or routing of messages. Most existing wireless communication technologies include methods or protocols for a device to relay or route messages which are destined to reach another device. In fact, for these technologies, much (often the majority) of the power consumption is due to relaying and routing activities. Hence, for mobile devices, it is an important question whether relaying and routing functions are worth the cost of the drain on precious battery power. Nevertheless, existing technologies, including the '896 patent and Mobile Ad hoc Networks (MANET) contemplate and rely on relaying and routing functions.

It can be seen, then, there exists a need in the field for a method and system for wireless peer-to-peer communication over an unlicensed wireless communication spectrum within a medium-range distance without routing or relaying of messages.

SUMMARY OF THE INVENTION

Accordingly, the present invention addresses the foregoing need for a method and system for wireless peer-to-peer communication over an unlicensed wireless communication spectrum within a medium-range distance without routing or relaying of messages.

According to one aspect of the invention, the present invention is a method for wireless peer-to-peer communication over an unlicensed wireless communication spectrum within a medium-range distance without routing or relaying of messages, comprising the steps of: assigning a unique identifier to a peer including at least a first peer and a second peer; uploading a unique identifier of the first peer to the second peer; uploading a unique identifier of the second peer to the first peer; assigning at the first peer a state of the second peer to an active state or an inactive state; assigning at the second peer a state of the first peer to an active state or an inactive state; broadcasting from a broadcasting peer its unique identifier over the unlicensed wireless communication spectrum; detecting at a detecting peer a presence of the broadcasting peer within an operating range of wireless communication by monitoring for and receiving the broadcast unique identifier signal; determining at the detecting peer whether the received unique identifier of the broadcasting peer matches a unique identifier previously uploaded to the detecting peer; transmitting from the detecting peer an authorization message to the broadcasting peer that authorizes communication connection between the broadcasting peer and the detecting peer, if (a) the received unique identifier of the broadcasting peer matches the unique identifier previously uploaded to the detecting peer, and (b) the broadcasting peer has been assigned to an active state at the detecting peer; and establishing a communication connection between the broadcasting peer and the detecting peer; wherein a collision avoidance protocol is employed to avoid message collisions among peers operating within the medium range distance of wireless communication.

In another aspect of the invention, the present invention is a peer communication device for wireless peer-to-peer communication over an unlicensed wireless communication spectrum within a medium-range distance without routing or relaying of messages, wherein a collision avoidance protocol is employed, the peer communication device comprising: a first memory for storing a unique identifier; a short-range transceiver for exchanging unique identifiers; a receiver for receiving incoming messages; a transmitter for transmitting outgoing messages; a second memory for storing incoming messages and outgoing messages; a processor; and a power supply, wherein: (1) the unique identifiers are exchanged between a pair of peer communication devices via the short-range transceiver before any communication can take place between the peer communication devices, (2) the exchanged unique identifiers are assigned to an active state or an inactive state, (3) the transmitter broadcasts the unique identifier stored in the first memory over the unlicensed wireless communication spectrum, (4) a presence of a peer communication device is detected when the receiver receives a broadcast unique identifier, (5) the processor determines whether the received unique identifier matches any of the exchanged unique identifiers, (6) if matched, the processor forms an authorization message if the received unique identifier has been assigned to an active state, (7) the transmitter transmits the authorization message over the unlicensed wireless communication spectrum, and (8) a communication connection is established between the pair of peer communication devices.

In yet another aspect of the invention, the present invention is a system for wireless peer-to-peer communication over an unlicensed wireless communication spectrum within a medium-range distance without routing or relaying of messages, comprising: means for assigning a unique identifier to a peer including at least a first peer and a second peer; means for uploading a unique identifier of the first peer to the second peer; means for uploading a unique identifier of the second peer to the first peer; means for assigning at the first peer a state of the second peer to an active state or an inactive state; means for assigning at the second peer a state of the first peer to an active state or an inactive state; means for broadcasting from a broadcasting peer its unique identifier over the unlicensed wireless communication spectrum; means for detecting at a detecting peer a presence of the broadcasting peer within an operating range of wireless communication by monitoring for and receiving the broadcast unique identifier signal; means for determining at the detecting peer whether the received unique identifier of the broadcasting peer matches a unique identifier previously uploaded to the detecting peer; means for transmitting from the detecting peer an authorization message to the broadcasting peer that authorizes communication connection between the broadcasting peer and the detecting peer, if (a) the received unique identifier of the broadcasting peer matches the unique identifier previously uploaded to the detecting peer, and (b) the broadcasting peer has been assigned to an active state at the detecting peer; means for establishing a communication connection between the broadcasting peer and the detecting peer; and means for communicating electronic messages between the broadcasting peer and the detecting peer, wherein a collision avoidance protocol is employed to avoid message collisions among peers operating within the medium range distance of wireless communication.

According to yet another aspect of the invention, the present invention is computer-executable process steps for wireless peer-to-peer communication over an unlicensed wireless communication spectrum within a medium-range distance without routing or relaying of messages, wherein the process steps are stored on a computer-readable medium, the steps comprising: a step for assigning a unique identifier to a peer including at least a first peer and a second peer; a step for uploading a unique identifier of the first peer to the second peer; a step for uploading a unique identifier of the second peer to the first peer; a step for assigning at the first peer a state of the second peer to an active state or an inactive state; a step for assigning at the second peer a state of the first peer to an active state or an inactive state; a step for broadcasting from a broadcasting peer its unique identifier over the unlicensed wireless communication spectrum; a step for detecting at a detecting peer a presence of the broadcasting peer within an operating range of wireless communication by monitoring for and receiving the broadcast unique identifier signal; a step for determining at the detecting peer whether the received unique identifier of the broadcasting peer matches a unique identifier previously uploaded to the detecting peer; a step for transmitting from the detecting peer an authorization message to the broadcasting peer that authorizes communication connection between the broadcasting peer and the detecting peer, if (a) the received unique identifier of the broadcasting peer matches the unique identifier previously uploaded to the detecting peer, and (b) the broadcasting peer has been assigned to an active state at the detecting peer; a step for establishing a communication connection between the broadcasting peer and the detecting peer; and a step for communicating electronic messages between the broadcasting peer and the detecting peer.

In the following description of the preferred embodiment, the reference is made to the accompanying drawings that form a part thereof, and in which is shown by way of illustration a specific embodiment in which the invention may be practiced. It is to be understood that other embodiments may be utilized and changes may be made without departing from the scope of the present invention.

BRIEF DESCRIPTION OF THE DRAWINGS

Referring now to the drawings in which like reference numbers represent corresponding parts throughout:

FIG. 6 illustrates the functions of the Application Layer services;

FIG. 9 illustrates the Request To Connect Authorization (RTCA) message;

FIG. 10 illustrates the Request To Connect Authorization Response (RTCAR) message;

FIG. 11 illustrates the Service Connect (SCON) message;

FIG. 12 illustrates the Service Connect Result (SCONR) message;

FIG. 13 illustrates the Service Data (SDATA) message;

FIG. 14 illustrates the Service Data Acknowledgment (SDACK) message;

FIG. 15 illustrates the Service Disconnection (SDISCON) message;

DETAILED DESCRIPTION OF THE INVENTION

For the purpose of the present invention, a peer or a peer communication device is defined as any device with a unique identifier, having a wireless communication capability and practicing a communication protocol. Wireless communication can be over any wireless communication medium, including any radio frequency (RF) spectrum and infrared (IR) frequency without departing from the scope of the present invention. In addition, although an example of a communication protocol is described below, the communication protocol can be any wireless communication protocol without departing from the scope of the present invention.

Each peer is assigned a unique identifier from a fixed population of identifiers issued and recorded by the party designated by the inventors of the present invention. Each identifier consists of 4 octets, an octet being 8 bits.

Figure 1:
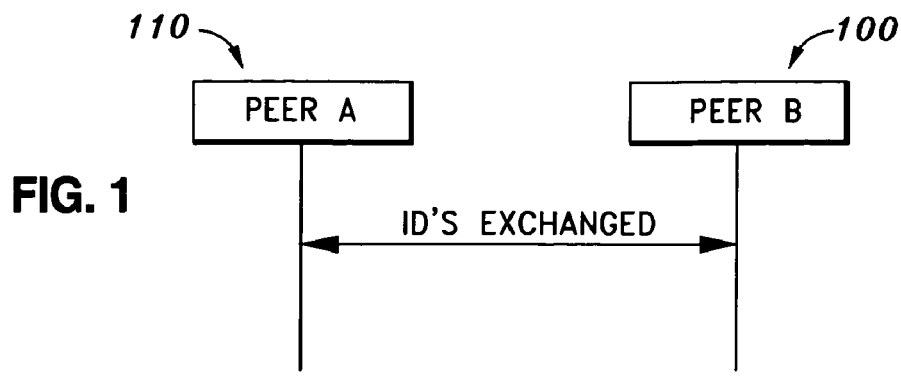
FIG. 1 illustrates initial exchange of unique identifiers between peers.

FIG. 1 illustrates initial exchange of unique identifiers between peers. As shown in FIG. 1, Peer A (100) and Peer B (110) exchange its own unique identifier with each other. The exchange of unique identifier must take place first before any further communication is possible between Peer A (100) and Peer B (110). The exchange can be accomplished over any short-range wireless communication medium, including the infrared (IR) frequency and Bluetooth spectrum without departing from the scope of the present invention. The unique identifier exchange can also take place over a wire link, including a serial connection and a network connection, without departing from the scope of the present invention. In addition, the unique identifier exchange can be accomplished over the Internet without departing from the scope of the present invention.

The unique identifier exchange process can be repeated with a multitude of peers. Through the exchange process, each peer builds a list of peers or peer identifiers with active or inactive states. A peer can communicate with only those peers which are on its peer list.

Figure 2:
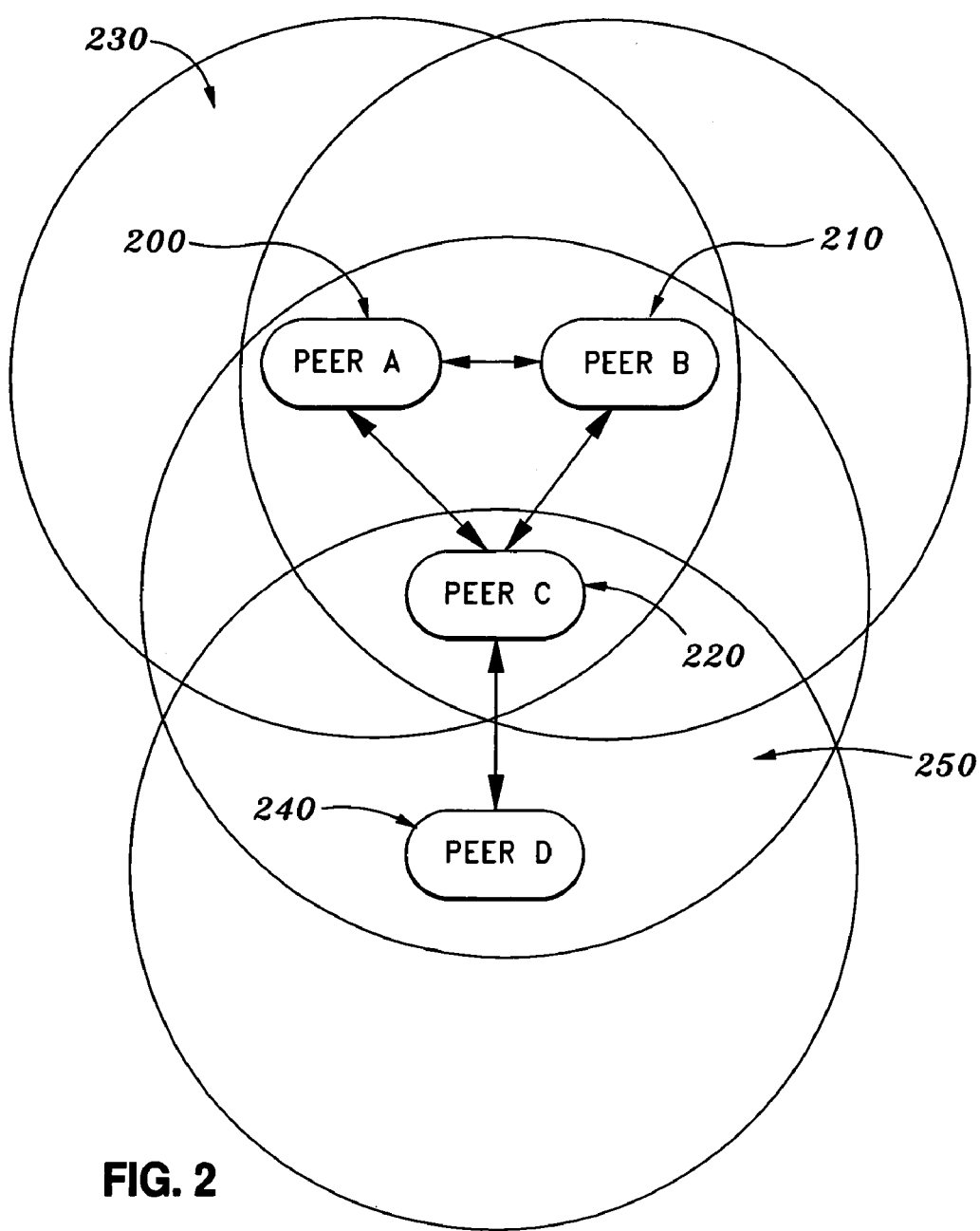
FIG. 2 illustrates allowable communication links between various peers without relaying or routing of messages.

FIG. 2 illustrates allowable communication links between various peers without relaying or routing of messages. As shown in FIG. 2, Peer A (200) can establish communication links with Peer B (210) and Peer C (220) upon detecting the presence of Peer B (210) and Peer C (220) within the range of wireless communication (230) of Peer A (200). Similarly, Peer C (220) can communicate with Peer A (200), Peer B (210), and Peer D (240), which are within the range of wireless communication (250) of Peer C (220). However, Peer A (200) cannot communicate with Peer D (240), as messages from Peer A (200) are not relayed by Peer C (220).

Figure 3A:
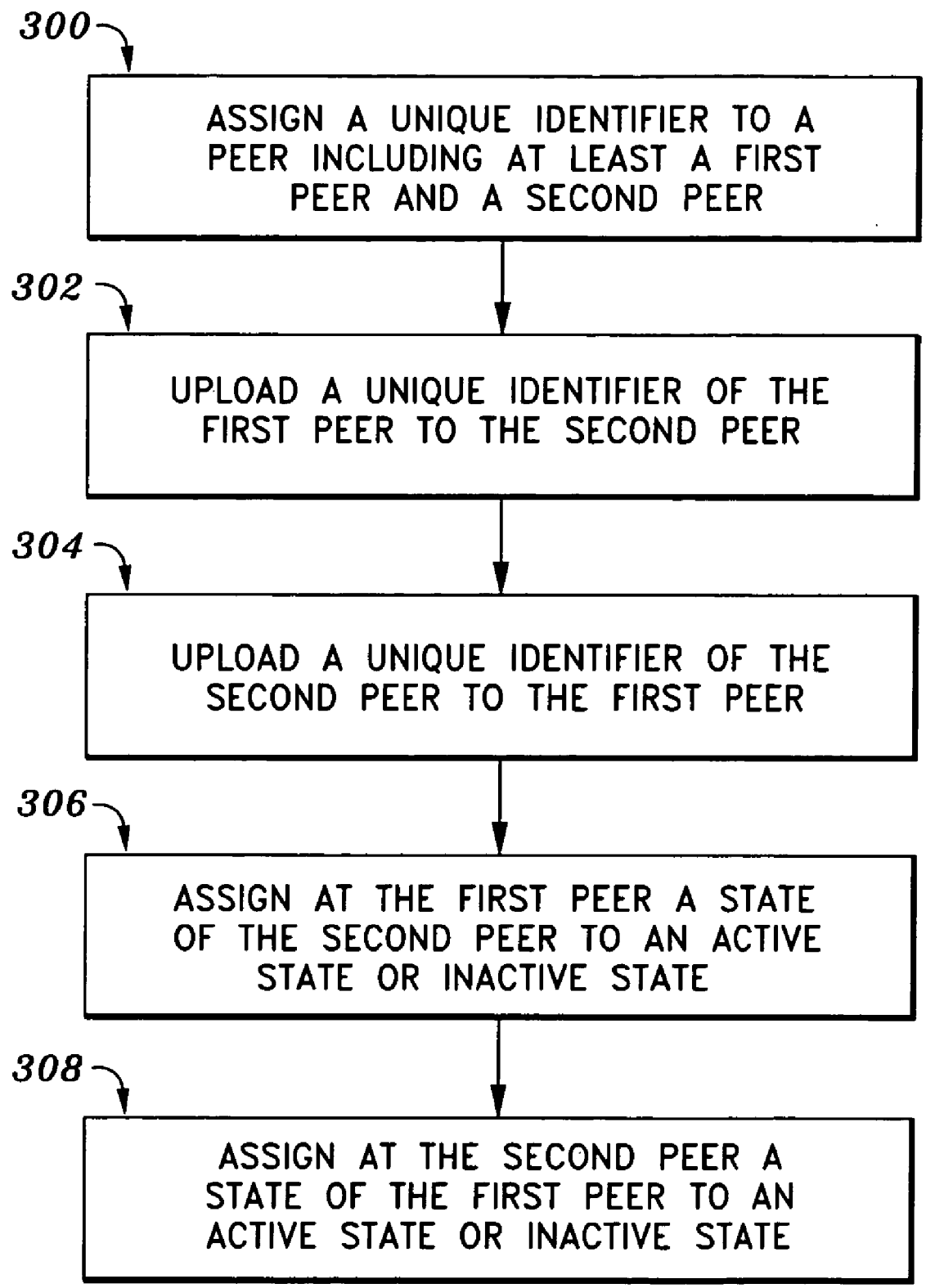
FIG. 3a illustrates a flowchart for exchanging unique identifiers in accordance with the present invention.

FIG. 3a illustrates a flowchart for exchanging unique identifiers in accordance with the present invention. As shown in FIG. 3a, a unique identifier is initially assigned to a peer including at least a first peer and a second peer (Step 300). Before any communication can take place between the first peer and the second peer, the unique identifiers must be exchanged between them. The unique identifier of the first peer is uploaded to the second peer (Step 302), and the unique identifier of the second peer is uploaded to the first peer (Step 304). Subsequently, the first peer assigns the second peer to an active state or an inactive state (Step 306), and the second peer assigns the first peer to an active state or an inactive state (Step 308).

Figure 3B:
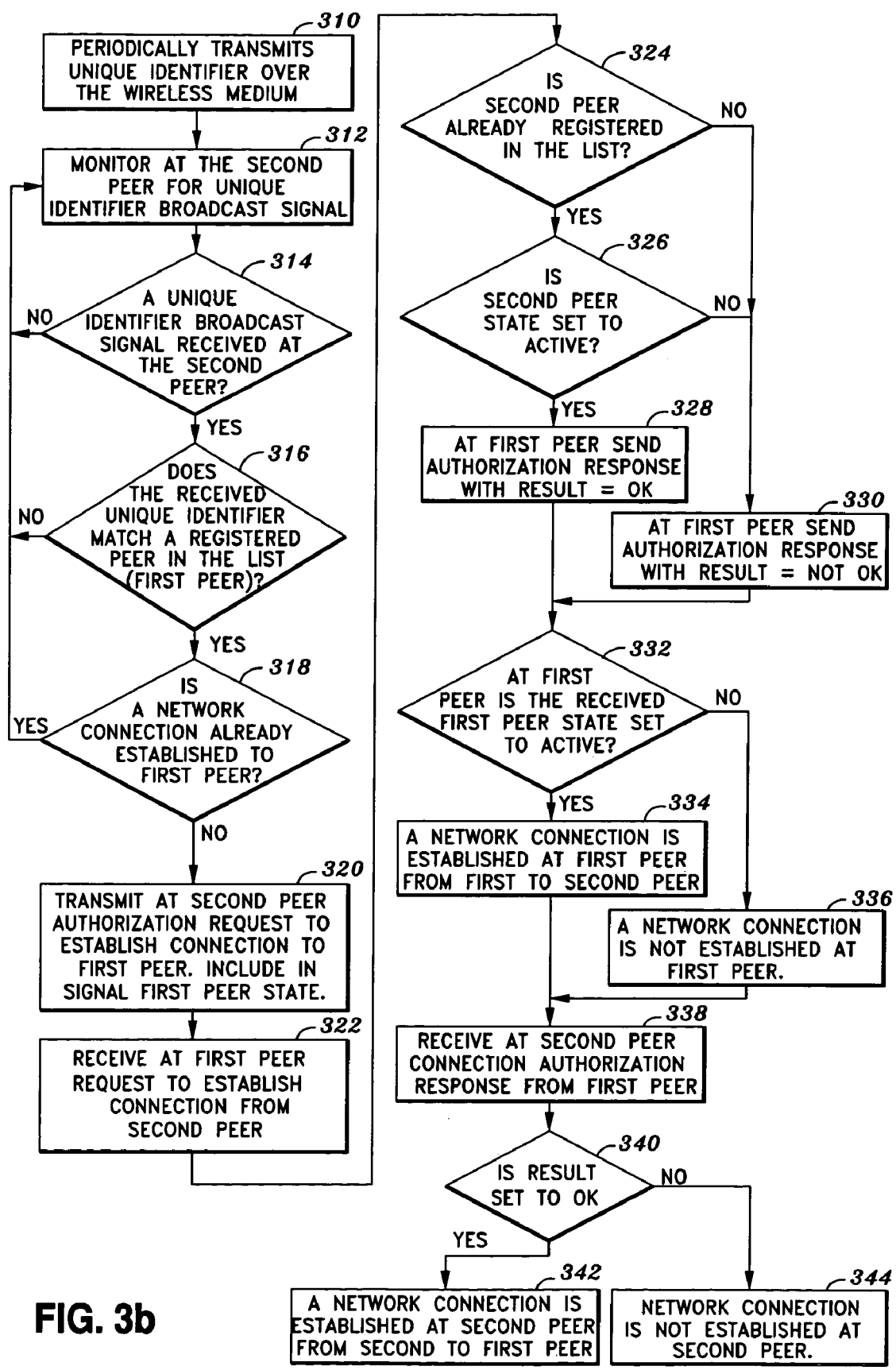
FIG. 3b illustrates a flowchart for establishing a communication connection in accordance with the present invention.

FIG. 3b illustrates a flowchart for establishing a communication connection in accordance with the present invention. As shown in FIG. 3b, when powered up and in use, a peer broadcasts its unique identifier over the wireless communication spectrum (Step 310). Then, a presence of a peer within the operating range of the wireless communication is detected by monitoring for the broadcast unique identifier signals. For example, the second peer monitors for the broadcast unique identifier signals (Step 312). When a unique identifier signal is detected (Step 314), the second peer determines whether the received identifier matches any one of the unique identifiers previously uploaded through the exchange process, e.g., the unique identifier of the first peer (Step 316). If there is no match, the second peer continues monitoring (Step 312). If there is a match, e.g., the unique identifier of the first peer has been received, then the second peer determines whether the first peer has been already involved in a network connection with first peer (Step 318), if connection is already in progress, second peer continues monitoring for other peers (Step 312). Second peer transmits an authorization to establish connection request at second peer. This message is sent to first peer, including an authorization (whether OK or NOT OK) for first peer to establish a connection at his end (Step 320).

When the first peer receives the authorization request message from the second peer (Step 322), it determines if the second peer is also registered in list of valid peers (Step 324), and it determines if second peer has been assigned to an active state (Step 326). If both conditions are met first peer responds back with a message authorizing second peer to setup a connection (Step 328). If any of the two conditions failed, then first peer responds back with a message not authorizing second peer to setup a connection (Step 330). The first peer also determines if the second has granted authorization to establish a connection at first peer (Step 332). First peer will setup a connection to second peer if the message contains positive authorization (Step 334), otherwise a connection is not established (336). At this point if a connection is established at first peer to second peer, any messages can be received and processed at first peer originating from second peer.

When the second peer receives the authorization response message (Step 338) it determines if the message has positive authorization (Step 340), if yes second peer will establish a connection to first peer (Step 342) otherwise a connection is not established (Step 344).

In an alternative embodiment, authorization for establishing a communication connection can be issued by a detecting peer upon detecting a presence of the broadcasting peer without departing from the scope of the present invention.

One advantage of the present invention is making low cost wireless communication possible and widely available by obviating the necessity for investing in extensive infrastructure. Low cost availability is further facilitated by utilizing unlicensed spectrum for wireless communication. The unlicensed communication spectrum employed in the present invention can be any suitable spectrum known to those skilled in the art, including 460 MHz band, 900 MHz band, 2.4 GHz band, and 5.7 GHz band, without departing from the scope of the present invention.

Another advantage of the present invention is conservation of power. By not relaying or routing messages, drain on precious battery power is avoided for handheld mobile devices that rely on rechargeable or disposable batteries. Moreover, direct peer-to-peer communication method of the present invention has a further benefit of avoiding crowding air space with unnecessary relayed or routed messages.

Despite not relaying or routing messages, the utility of the present invention as a communication tool is realized by enabling wireless communication over a medium distance range. Wireless communication limited to a short distance, e.g., within a "shouting distance", is useless for person-to-person message communication device. In the present invention, direct peer-to-peer communication is enabled over a medium distance range including and up to 5 miles. For peer-to-peer operation to operate for such distance, a collision avoidance mechanism must be implemented as described below.

Figure 4:
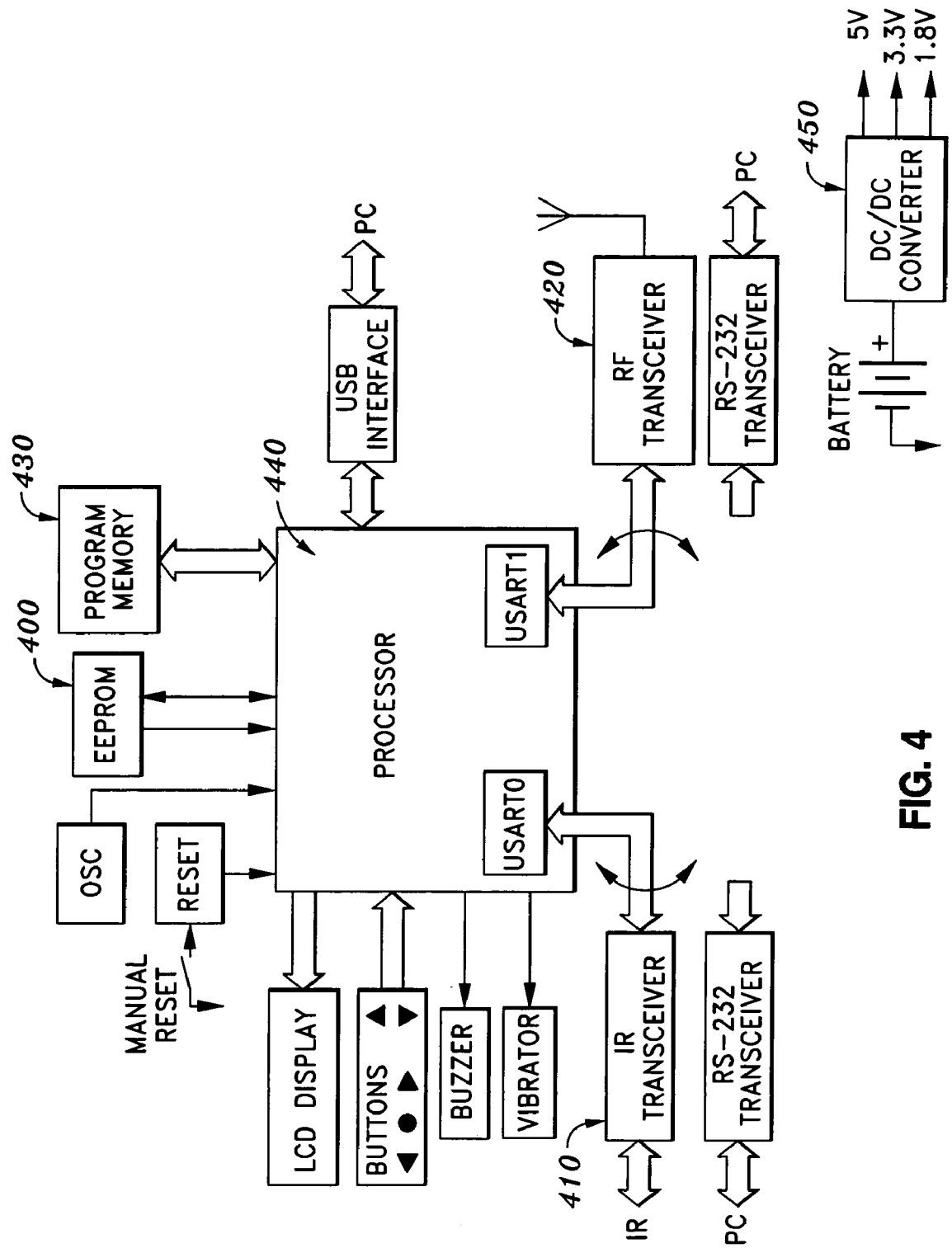
FIG. 4 illustrates a block diagram of a hardware embodiment in accordance with the present invention.

According to another aspect of the invention, the present invention is a device for wireless peer-to-peer communication over an unlicensed wireless communication spectrum within a medium-range distance without routing or relaying of messages, wherein a collision avoidance protocol is employed. FIG. 4 illustrates a block diagram of a hardware embodiment in accordance with the present invention. The device of the present invention comprises a memory for storing a unique identifier (400), a short-range transceiver for exchanging unique identifiers (410), a receiver for receiving incoming messages (420), a transmitter for transmitting outgoing messages (420), a memory for storing incoming messages and outgoing messages (430), a processor (440), and a power supply (450).

The memory for storing a unique identifier (400) can be any persistent memory device known to those skilled in the art, including EEPROM, without departing from the scope of the present invention. The unique identifiers are exchanged over a short-range transceiver (410), which can be any short-range transceiver known to those skilled in the art, including a infrared (IR) transceiver, a Bluetooth transceiver, and a serial link (RS-232) transceiver, without departing from the scope of the present invention. The receiver and transmitter of the present invention (420) can be those provided by any transceiver operating over an unlicensed spectrum known to those skilled in the art, including a 460 MHz transceiver, a 900 MHz transceiver, a 2.4 GHz band transceiver, and a 5.7 GHz band transceiver, without departing from the scope of the present invention.

Messages are formed, processed, and stored in a memory device. The memory for storing incoming messages and outgoing messages (430) can be any memory device known to those skilled in the art, including DRAM, SRAM, and Flash Memory device, without departing from the scope of the present invention. Processor (440) can be any low-power processor suitable for handheld, mobile devices known to those skilled in the art, including the ARM processor and the XScale processor, without departing from the scope of the present invention. The device of the present invention is powered by a portable power supply (450) which can be any portable power supply suitable for handheld, mobile device known to those skilled in the art, including a rechargeable battery and a disposable battery, without departing from the scope of the present invention.

Figure 5:
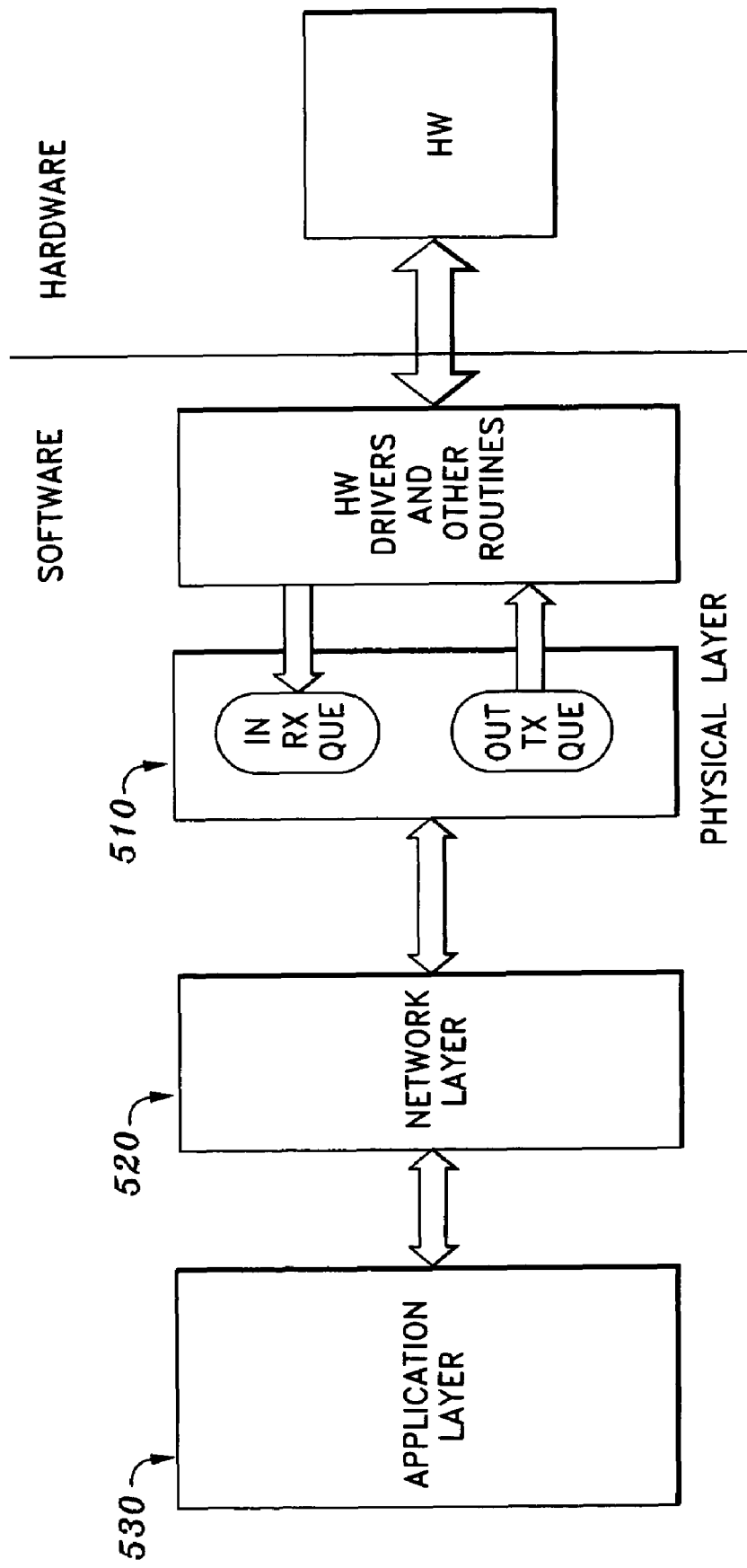
FIG. 5 illustrates an overview of hardware and software architecture in accordance with the present invention.

In another embodiment of the invention, the present invention is a system of software and hardware for peer-to-peer wireless communication. FIG. 5 illustrates an overview of hardware and software architecture in accordance with the present invention. The software architecture comprises three layers: physical layer (510), network layer (520) and application layer (530).

FIG. 6 illustrates the functions of the Application Layer (530) services. FIG. 6 shows a table that lists the function name (610), parameters (620), and description (630) of the Application Layer services. In one embodiment, the functions are API's (Application Program Interfaces) to the Network Layer.

The data being exchanged in a service session is specific and makes sense only to the service type being used. The transmission could be sent through either reliable or unreliable connection. A reliable connection requires acknowledgement from the receiver for every packet transmitted. Handling of reliable connection is performed by the Network Layer. Another way to send information is via broadcasting a data to all users in the transmission range. Broadcasting does not require two-way service connection to be established, and the data sent requires no acknowledgment.

Network Layer (520) performs the following functions:
  Broadcast own identifier (ID) to other peers periodically.
  Detect other peers.
  Establish a network connection and notify the application layer when a new peer is connected.
  Perform service connection to the desired peer and maintains the connection state.
  Perform transmission and acknowledgment of application messages, message retransmission, and message segmentation and repacking.

Figure 7:
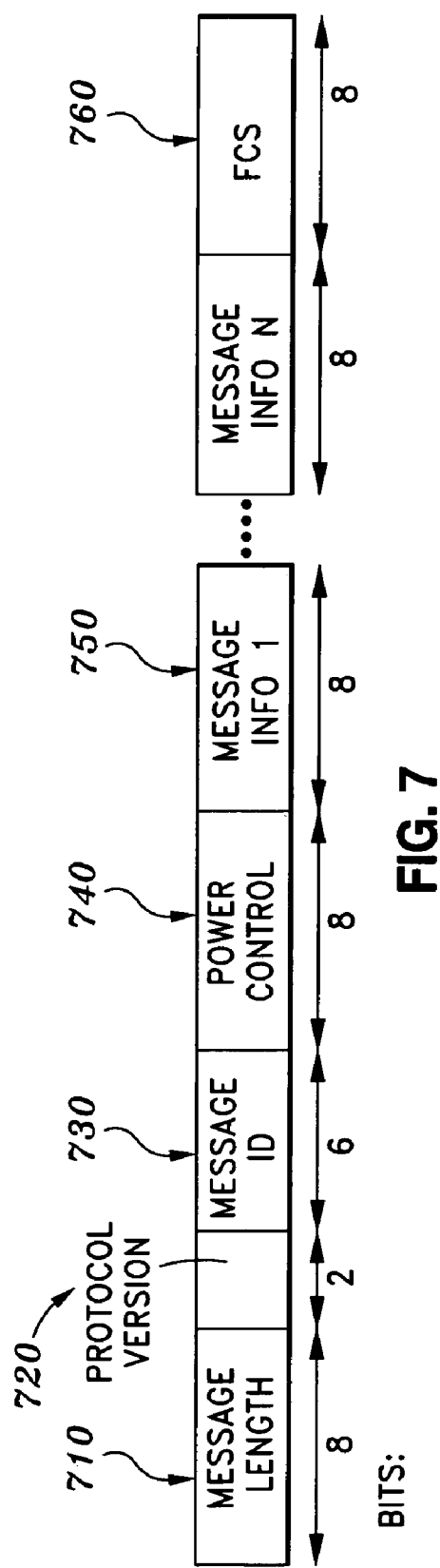
FIG. 7 illustrates the format of the Network Layer messages.

FIG. 7 illustrates the format of the Network Layer messages. As shown in FIG. 7, a network message comprises Message Length field (710), Protocol Version field (720), Message ID field (730), Power Control field (740), Message Information fields (750), and Frame Check Sum (FCS) field (760). The entire message data is sometimes called a message frame.

Message Length field (710) holds the length value of the entire message data. Protocol Version field (720) indicates the protocol version currently in use. Message ID field (730) holds a unique value for each distinct message type. Power Control field (740) contains power control information for the recipient peer. This will be used to indicate to the receiving peer if future transmissions can occur at a lower or higher power values. The possible values for Power Control field (740) are: 128 meaning "transmit at the same pervious level", less than 128 meaning "transmit at a lower level, the difference to 128 indicating the level to which to drop the transmit power", greater than 128 meaning "transmit at a higher level, the difference to 128 indicating the level to which to increase the transmit power". Message Information fields (750) hold information and data related to the message. Frame Check Sum (FCS) field (760) is the least significant byte for the sum of all octets in the message frame. Each peer receiving a frame will calculate a frame check sum and compare it to the one embedded in the message. If the two values are different, the frame will be discarded.

Figure 8:
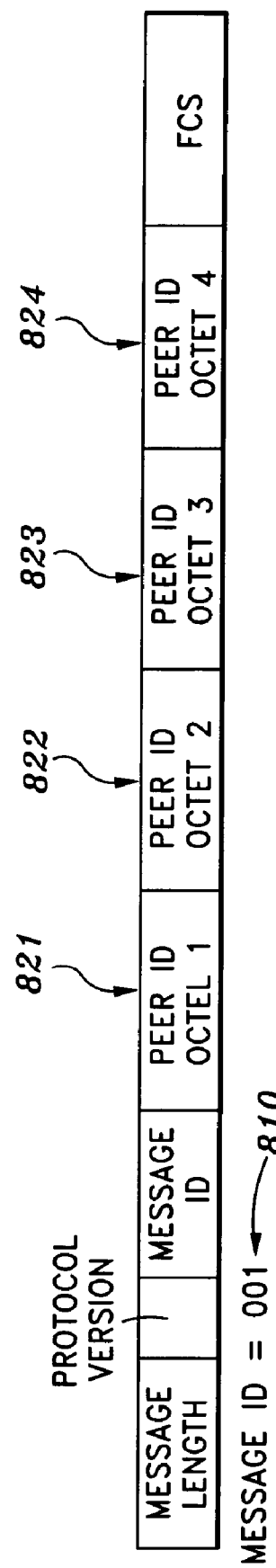
FIG. 8 illustrates the Own Identity (OWNID) message.

FIG. 8 illustrates the Own Identity (OWNID) message. As shown in FIG. 8, OWNID message has Message ID value of 001 (810), and contains a peers own unique identifier comprising 4 octets (821, 822, 823, and 824). A peer broadcasts the OWNID message over the wireless medium (WM), and other peers listen and detect this message.

FIG. 9 illustrates the Request To Connect Authorization (RTCA) message. As shown in FIG. 9, the RTCA message has Message ID value of 002 (910). A peer or station 'PEER B' receiving OWNID message from another station 'PEER A' requests permission to establish a connection by responding with the RTCA message. The RTCA message contains PEER A unique ID, PEER B unique ID and a sequence number generated by PEER B called sequence ID which is used for control purposes. The message contains first the destination ID (PEER A) (920) and then the source ID (PEER B) (930). Sequence ID (940) occupies two octets. The message also contains an authorization flag (934) granting PEER A permission to establish a connection at its end.

FIG. 10 illustrates the Request To Connect Authorization Response (RTCAR) message. As shown in FIG. 10, the RTCAR message has Message ID value of 003 (1010). The RTCAR message is transmitted in response to RTCA message, and has the same structure as RTCA with additional information containing the authorization result (1020). The possible values of the result field are: 001 for "connection is authorized", and 002 for "connection is not authorized".

FIG. 11 illustrates the Service Connect (SCON) message. As shown in FIG. 11, the SCON message has Message ID value of 004 (1110) and contains the service type (1120) being requested. When an application layer attempts to open a service connection, the network layer will send this message to the destination station requesting it to prepare itself for this service connection. FIG. 11 shows PEER A attempting to open a service connection to PEER B.

FIG. 12 illustrates the Service Connect Result (SCONR) message. As shown in FIG. 12, the SCONR message has Message ID value of 005 (1210) and contains the service connection result field (1220). The possible values of the result field are: 001 for Connection Established, 002 for Busy, 003 for Service Not Supported, and 004 for Service Establishment Failure.

FIG. 13 illustrates the Service Data (SDATA) message. As shown in FIG. 13, the SDATA message has Message ID value of 006 (1310). This message is used to transmit service specific data to a remote station. Each message holds a maximum of 240 bytes of service data. If the application is sending more than 240 bytes, then the network layer will divide the buffer into segments such that each segment size is 240 bytes.

In order for the remote station to do segment repacking, the total segment number is included in SDATA message. The maximum number of segments the station can handle is 255 (one octet size) which means an application can request a maximum one-time transmission of:

$$255 \text{ segments} * 240 \text{ bytes/segments} = 61200 \text{ bytes (60 Kbyte)}.$$

FIG. 14 illustrates the Service Data Acknowledgment (SDACK) message. As shown in FIG. 14, the SDATA message has Message ID value of 007 (1410). This message is used to acknowledge that a station received service data segments. This message contains information about the number of segments being acknowledged, start of segment number in the message and a bit map indicating which segments are being acknowledged. A bit map "1" indicates that a segment is received, and 0 means that the segment is not received and retransmission should occur for that particular segment.

FIG. 15 illustrates the Service Disconnection (SDISCON) message. As shown in FIG. 15, the SDISCON message has Message ID value of 008 (1510). This message is used to indicate end of service connection. The message holds the ID of the transmitter and station ID of the receiver. This message requires no acknowledgement.

A peer of the present invention uses power control mechanism to minimize the transmit power thus extending the battery life. Every packet received from the physical layer will also have a power measurement attribute which represents the average power level at which the message or packet is received. This power control has meaning when a peer or a station is engaged in a two way communication with another station. The OWNID messages do not have this control octet since this message is transmitted at the max possible level.

When a message is received from a peer, e.g., PEER A, the receiving peer, e.g., PEER B, will examine the power attribute received from the physical layer and determine if it is higher or lower than a threshold level at which message reception is acceptable. PEER B will set this power control octet to a value based on the difference to this threshold so that PEER A can adjust its transmitted power level for future messages destined to PEER B. Similarly, PEER A will check the power control field in the PEER B messages and instruct the physical layer the transmit level to use when sending a message to PEER B.

Figure 16:
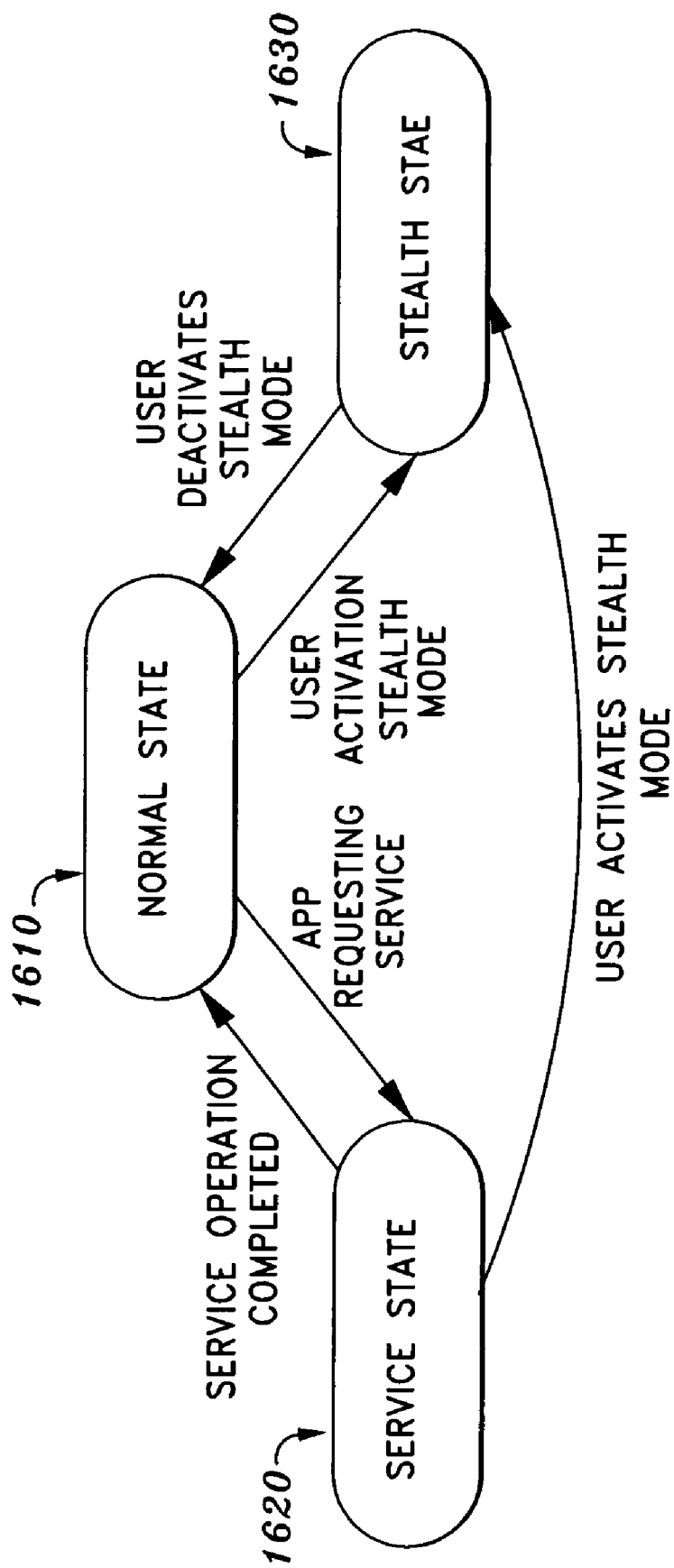
FIG. 16 illustrates the state diagram for a peer's own state.

FIG. 16 illustrates the state diagram for a peer's own state. As shown in FIG. 16, a peer states are: Normal State (1610), Service State (1620), and Stealth State (1630). In Normal State (1610), a station is available for others to connect. In Service State (1620), a station is involved in a service connection with a remote station. In Stealth State (1630), a station does not send OWNID message, but monitors the network for other peers. Also, PEER B sets the connect control flag to NOK in RTCA messages.

Figure 17:
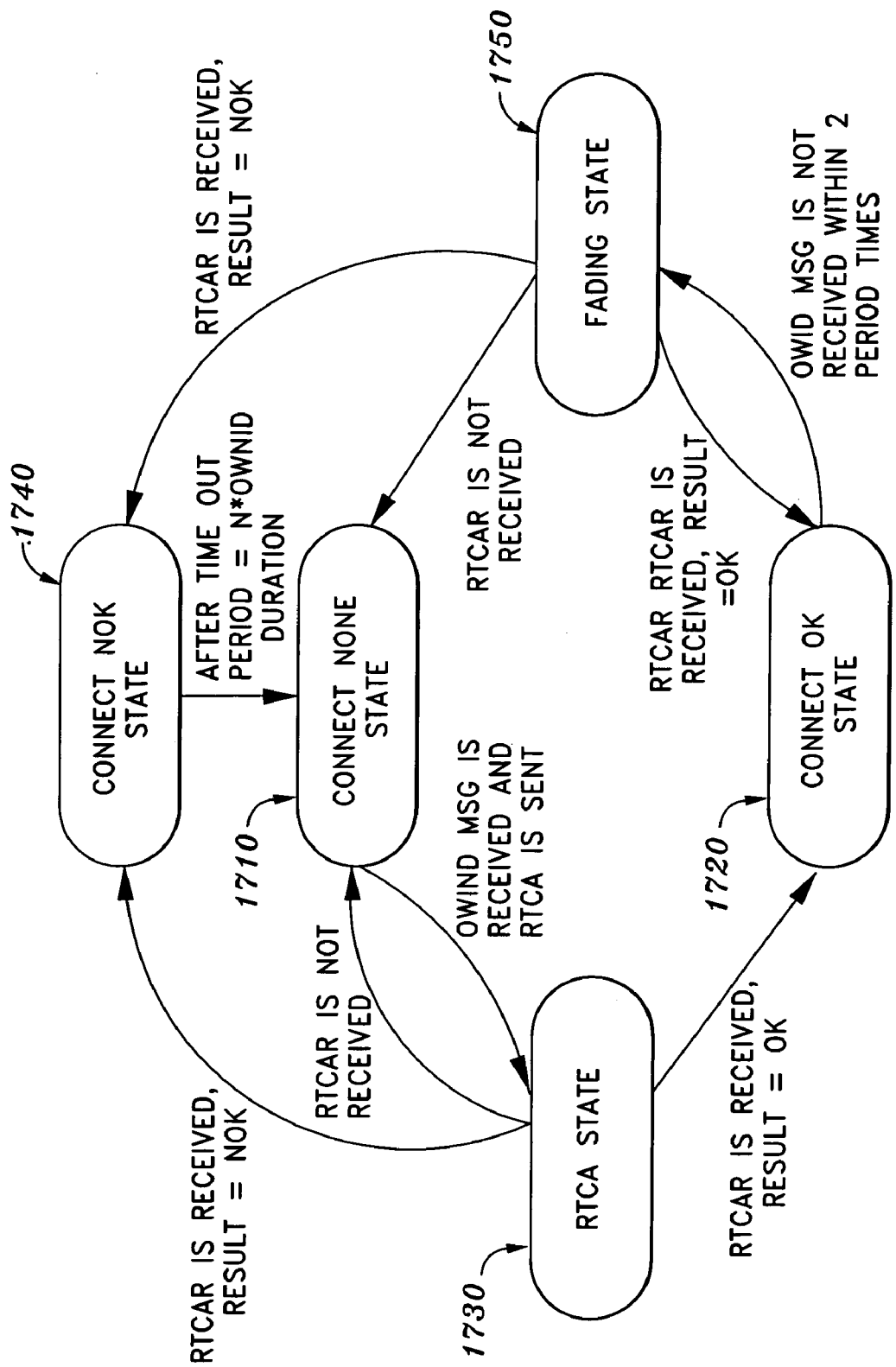
FIG. 17 illustrates the state diagram for peers in a peer list of a given peer.

FIG. 17 illustrates the state diagram for peers in a peer list of a given peer. As shown in FIG. 17, the states for peers in a peer list of a given peer are: Connect None State (1710), Connect OK State (1720), RTCA State (1730), Connect NOK State (1740), and Fading State (1750). Connect None State (1710) is the default state for a peer on the peer list. It indicates that this peer has not been detected. In Connect OK State (1720), a station is being detected and the result of RTCA is OK. Station status is notified to the application layer. In RTCA State (1730), the station has detected an OWNID message, responded with RTCA, and is waiting for RTCAR message. In Connect NOK State (1740), the station has received RTCAR with NOK. In Fading State (1750), the station did not receive OWNID message for an already detected peer. The state of this peer is set to 'Fading State' first before its state is cleared to Connect None State (1710).

Figure 18:
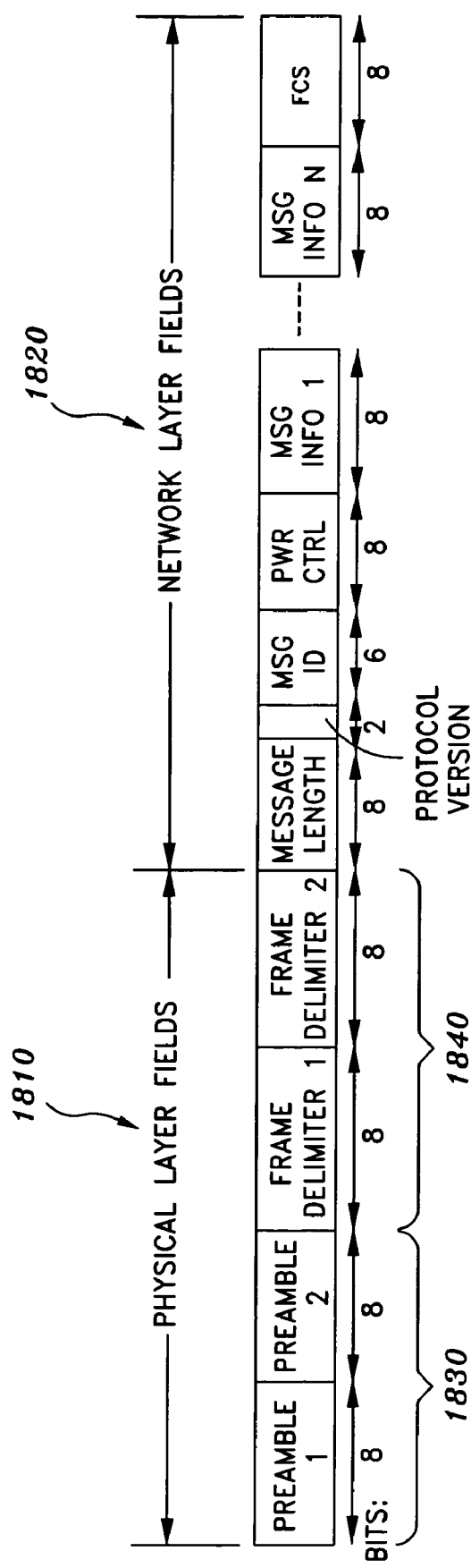
FIG. 18 illustrates Physical Layer message format.

The Physical Layer performs additional duties to deliver and receive messages to and from the network. This layer adds additional octets to the message received from the Network Layer before transmitting the message, and automatically strips these fields from the incoming received messages. FIG. 18 illustrates Physical Layer message format. As shown in FIG. 18, the physical layer fields (1810) are added to network layer fields (1820). Preamble octets (1830) help the hardware synchronize and detect messages. The preamble consists of a series of alternating ones and zeros giving a value of 0×AAAA. Frame delimiters (1840) are used by the physical layer to determine the beginning of frame. The suggested delimiter value to use is 0×4DBE. The physical layer will transmit information starting with the preamble field ending with the FCS octet.

Figure 19:
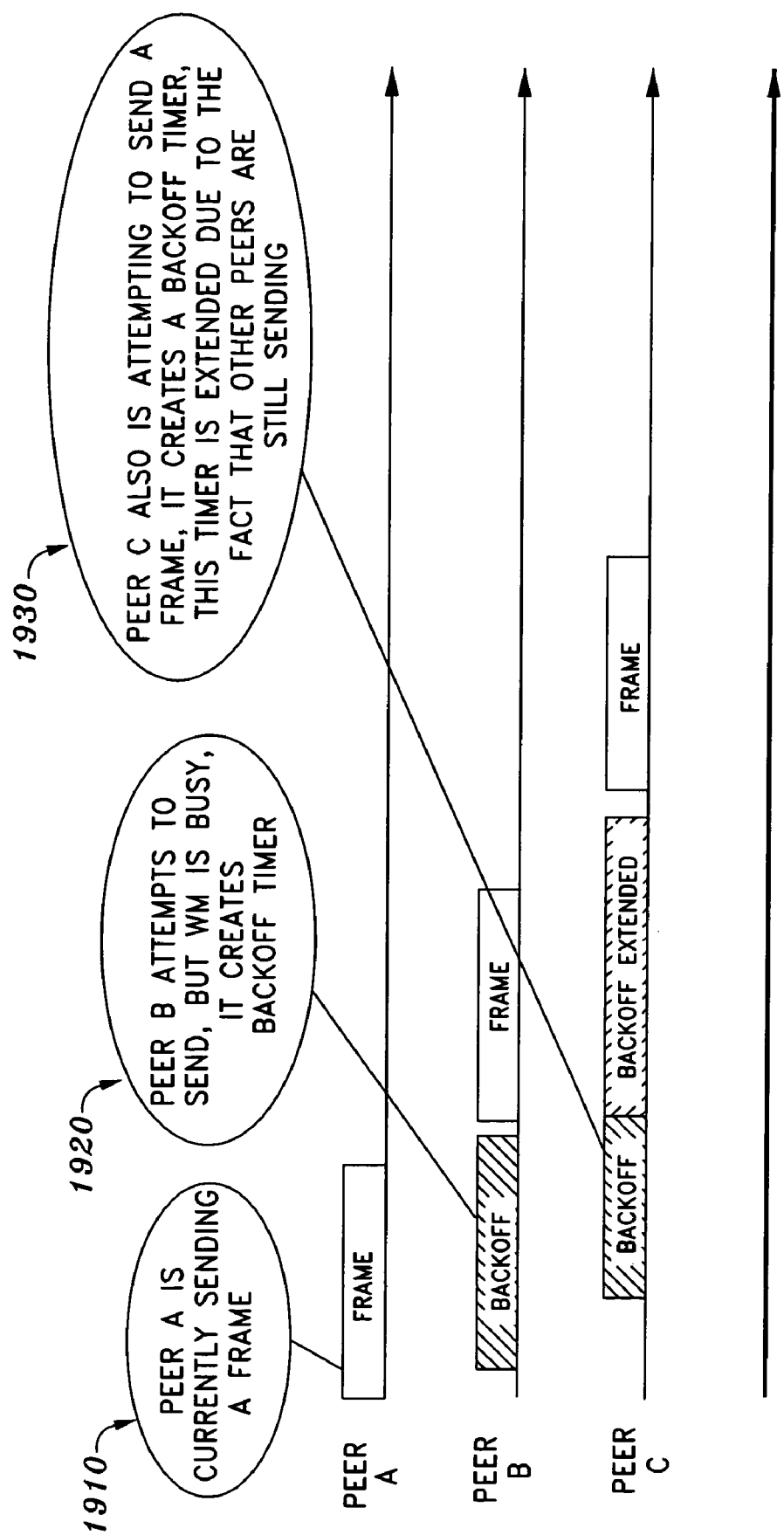
FIG. 19 illustrates the collision avoidance mechanism.

FIG. 19 illustrates the collision avoidance mechanism in accordance with the present invention. As shown in FIG. 19, PEER A is sending a frame (1910). PEER B is attempting to send, but because wireless medium (WM) is busy, it creates backoff timer (1920). PEER C is also attempting to send a frame, and creates a backoff timer (1930). This timer is extended due to the fact that other stations are still sending. The backoff timer will employ delays and random numbers, e.g.:

the maximum time it takes for the message to transmit+propagation delay+random number between (20 ms-200 ms).

The station will decrement the timer whenever the WM is idle and stop when the WM is busy. Additional algorithms known to those skilled in the art can be used without departing from the scope of the present invention to predict the time to send based on expected duration it takes to send a message and the number of stations detected around the station within the transmission range.

Figure 20:
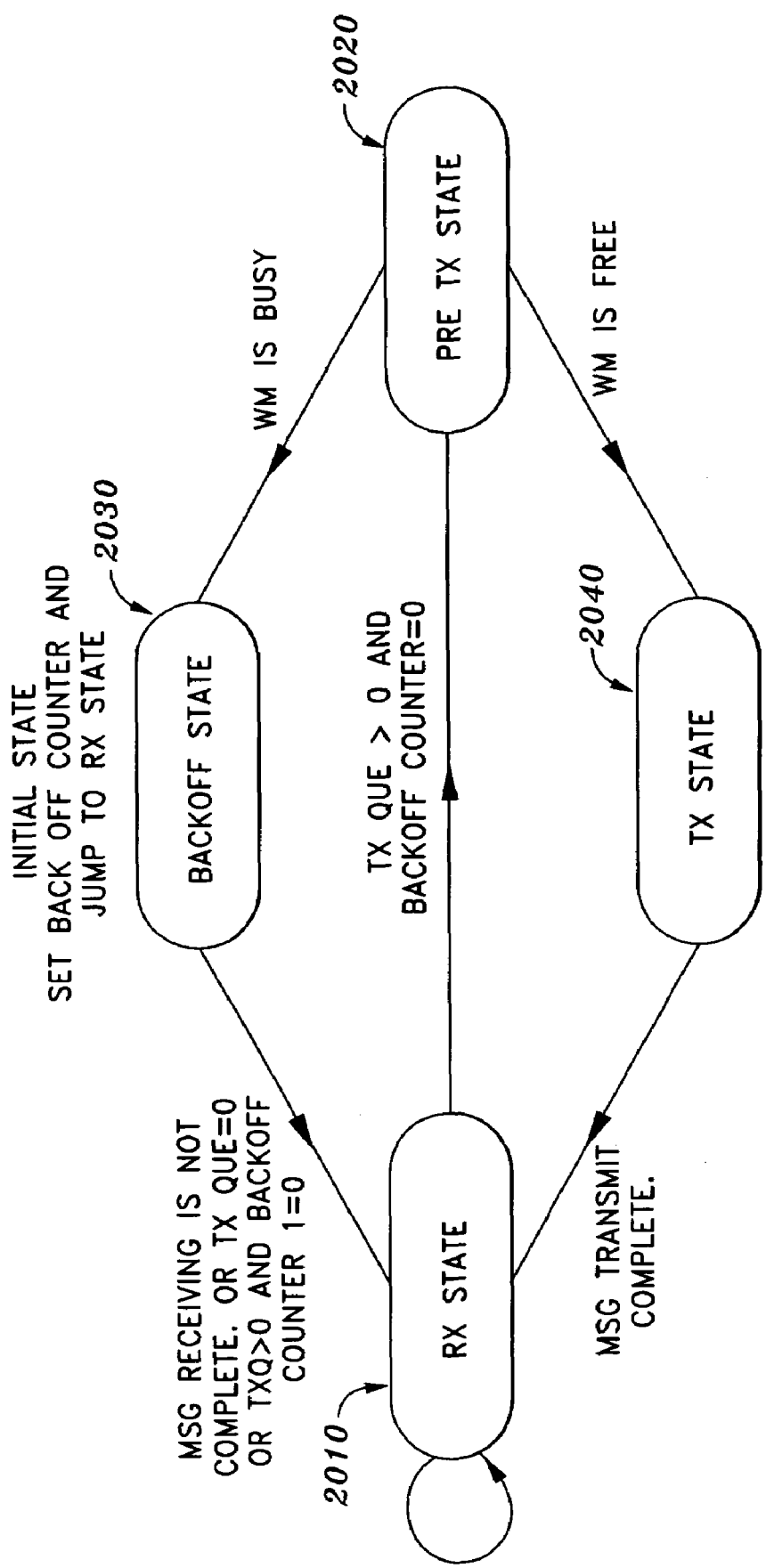
FIG. 20 illustrates the transmission states.

FIG. 20 illustrates the transmission states of the present invention. As shown in FIG. 20. the transmission states are: RX State (2010), Pre-TX State (2020), Backoff State (2030), and TX State (2040). In RX State (2010), a station is receiving messages or waiting to receive messages from the WM. In Pre-TX State (2020), the station is preparing to transmit messages. In Backoff State (2030), the station has initiated the backoff timer due to busy WM. When WM is cleared for transmission, the station transitions to TX State (2040) transmitting data to the WM. When all data in a frame have been transmitted, the station goes back to the RX State (2010).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A method for wireless peer-to-peer communication over an unlicensed wireless communication spectrum within a medium-range distance without routing or relaying of messages, comprising the steps of:
   assigning a unique identifier to a peer including at least a first peer and a second peer;
   uploading a unique identifier of the first peer to the second peer;
   uploading a unique identifier of the second peer to the first peer;
   assigning at the first peer a state of the second peer to an active state or an inactive state;
   assigning at the second peer a state of the first peer to an active state or an inactive state;
   building a peer list on a peer, the peer list comprising the unique identifiers uploaded to the peer;
   displaying the peer list;
   broadcasting from a broadcasting peer its unique identifier over the unlicensed wireless communication spectrum;
   detecting at a detecting peer a presence of the broadcasting peer within an operating range of wireless communication by monitoring for and receiving the broadcast unique identifier signal;
   determining at the detecting peer whether the received unique identifier of the broadcasting peer matches a unique identifier previously uploaded to the detecting peer;
   transmitting from the detecting peer a response message to the broadcasting peer, if (a) the received unique identifier of the broadcasting peer matches the unique identifier previously uploaded to the detecting peer, and (b) the broadcasting peer has been assigned to an active state at the detecting peer;
   upon receiving the response message from the detecting peer, determining at the broadcasting peer to authorize a communication connection between the broadcasting peer and the detecting peer, if (a) the detecting peer is on the broadcasting peer's peer list, and (b) the detecting peer has been assigned an active state on the broadcasting peer's peer list; transmitting from the broadcasting peer to the detecting peer an authorization message that authorizes the communication connection between the broadcasting peer and the detecting peer, if the communication connection is authorized; and
   establishing the communication connection between the broadcasting peer and the detecting peer.

2. The method of claim 1, wherein a collision avoidance protocol is employed to avoid message collisions among peers operating within the medium range distance of wireless communication.

3. The method of claim 1, further comprising the step of:
   communicating electronic messages between the broadcasting peer and the detecting peer.

4. The method of claim 1, wherein authorizing and establishing the communication connection between the broadcasting peer and the detecting peer is accomplished with a communication protocol that allows routing or relaying of messages.

5. The method of claim 1, further comprising the steps of:
   displaying on a peer a state of a detected peer within the medium-range distance of wireless communication;
   and continually updating and displaying the state of the detected peer.

6. The method of claim 1, wherein the medium-range distance is less than 5 miles.

7. The method of claim 1, wherein the unlicensed communication spectrum is 460 MHz band.

8. The method of claim 1, wherein the unlicensed communication spectrum is 900 MHz band.

9. The method of claim 1, wherein the unlicensed communication spectrum is 2.4 GHz band.

10. The method of claim 1, wherein the unlicensed communication spectrum is 5.7 GHz band.

11. A method for wireless peer-to-peer communication over an unlicensed wireless communication spectrum within a medium-range distance without routing or relaying of messages, comprising the steps of:

assigning a unique identifier to a peer including at least a first peer and a second peer;

uploading a unique identifier of the first peer to the second peer;

uploading a unique identifier of the second peer to the first peer;

assigning at the first peer a state of the second peer to an active state or an inactive state;

assigning at the second peer a state of the first peer to an active state or an inactive state;

broadcasting from a broadcasting peer its unique identifier over the unlicensed wireless communication spectrum;

detecting at a detecting peer a presence of the broadcasting peer within an operating range of wireless communication by monitoring for and receiving the broadcast unique identifier signal;

determining at the detecting peer whether the received unique identifier of the broadcasting peer matches a unique identifier previously uploaded to the detecting peer;

transmitting from the detecting peer an authorization message to the broadcasting peer that authorizes communication connection between the broadcasting peer and the detecting peer, if (a) the received unique identifier of the broadcasting peer matches the unique identifier previously uploaded to the detecting peer, and (b) the broadcasting peer has been assigned to an active state at the detecting peer; and establishing a communication connection between the broadcasting peer and the detecting peer.

12. The method of claim 11, wherein a collision avoidance protocol is employed to avoid message collisions among peers operating within the medium range distance of wireless communication.

13. The method of claim 11, further comprising the step of:

communicating electronic messages between the broadcasting peer and the detecting peer.

14. The method of claim 11, further comprising the steps of:

displaying on a peer a state of a detected peer within the medium-range distance of wireless communication;

and continually updating and displaying the state of the detected peer.

15. The method of claim 11, wherein the medium-range distance is less than 5 miles.

16. The method of claim 11, wherein the unlicensed communication spectrum is 460 MHz band.

17. The method of claim 11, wherein the unlicensed communication spectrum is 900 MHz band.

18. The method of claim 11, wherein the unlicensed communication spectrum is 2.4 GHz band.

19. The method of claim 11, wherein the unlicensed communication spectrum is 5.7 GHz band.

20. A peer communication device for wireless peer-to-peer communication over an unlicensed wireless communication spectrum within a medium-range distance without routing or relaying of messages, wherein a collision avoidance protocol is employed, the peer communication device comprising:

a first memory for storing a unique identifier;

a short-range transceiver for exchanging unique identifiers;

a receiver for receiving incoming messages;

a transmitter for transmitting outgoing messages;

a second memory for storing incoming messages and outgoing messages;

a processor; and a power supply, wherein: (1) the unique identifiers are exchanged between a pair of peer communication devices via the short-range transceiver before any communication can take place between the peer communication devices, (2) the exchanged unique identifiers are assigned to an active state or an inactive state, (3) a peer list comprising a list of the exchanged unique identifiers is built on the peer communication device, (4) the transmitter broadcasts the unique identifier stored in the first memory over the unlicensed wireless communication spectrum, (5) a presence of a peer communication device is detected when the receiver receives a broadcast unique identifier, (6) the processor determines whether the received unique identifier matches any of the exchanged unique identifiers by looking up the peer list, (7) if matched, the processor forms an authorization message if the received unique identifier has been assigned to an active state on the peer list, (8) the transmitter transmits the authorization message over the unlicensed wireless communication spectrum, and (9) a communication connection is established between the pair of peer communication devices.

21. The peer communication device of claim 20, further comprising: a display for showing a state of a detected peer within the medium-range distance of wireless communication and continually updating and displaying the state of the detected peer.

22. The peer communication device of claim 20, further comprising:

an input means for entering data, including personal information of a user.

23. The peer communication device of claim 20, further comprising a means for measuring a reception power level, the means coupled to the processor, wherein: (1) the processor includes a transmission power level when forming the response message, (2) the processor retrieves the reception power level from the means for measuring a reception power level, and (3) the processor calculates and adjusts a power level of a return signal based on the transmission power level and the reception power level.

24. The peer communication device of claim 20, wherein the medium-range distance is less than 5 miles.

25. The peer communication device of claim 20, wherein the unlicensed communication spectrum is 460 MHz band.

26. The peer communication device of claim 20, wherein the unlicensed communication spectrum is 900 MHz band.

27. The peer communication device of claim 20, wherein the unlicensed communication spectrum is 2.4 GHz band.

28. The peer communication device of claim 20, wherein the unlicensed communication spectrum is 5.7 GHz band.

29. A system for wireless peer-to-peer communication over an unlicensed wireless communication spectrum within a medium-range distance without routing or relaying of messages, comprising:

means for assigning a unique identifier to a peer including at least a first peer and a second peer;

means for uploading a unique identifier of the first peer to the second peer;

means for uploading a unique identifier of the second peer to the first peer;

means for assigning at the first peer a state of the second peer to an active state or an inactive state;

means for assigning at the second peer a state of the first peer to an active state or an inactive state;

means for broadcasting from a broadcasting peer its unique identifier over the unlicensed wireless communication spectrum;

means for detecting at a detecting peer a presence of the broadcasting peer within an operating range of wireless communication by monitoring for and receiving the broadcast unique identifier signal;

means for determining at the detecting peer whether the received unique identifier of the broadcasting peer matches a unique identifier previously uploaded to the detecting peer;

means for transmitting from the detecting peer an authorization message to the broadcasting peer that authorizes communication connection between the broadcasting peer and the detecting peer, if (a) the received unique identifier of the broadcasting peer matches the unique identifier previously uploaded to the detecting peer, and (b) the broadcasting peer has been assigned to an active state at the detecting peer;

means for establishing a communication connection between the broadcasting peer and the detecting peer; and means for communicating electronic messages between the broadcasting peer and the detecting peer;

wherein a collision avoidance protocol is employed to avoid message collisions among peers operating within the medium range distance of wireless communication.

30. A system for wireless peer-to-peer communication over an unlicensed wireless communication spectrum within a medium-range distance without routing or relaying of messages, comprising:

means for assigning a unique identifier to a peer including at least a first peer and a second peer;

means for uploading a unique identifier of the first peer to the second peer;

means for uploading a unique identifier of the second peer to the first peer;

means for assigning at the first peer a state of the second peer to an active state or an inactive state;

means for assigning at the second peer a state of the first peer to an active state or an inactive state;

means for broadcasting from a broadcasting peer its unique identifier over the unlicensed wireless communication spectrum;

means for detecting at a detecting peer a presence of the broadcasting peer within an operating range of wireless communication by monitoring for and receiving the broadcast unique identifier signal;

means for determining at the detecting peer whether the received unique identifier of the broadcasting peer matches a unique identifier previously uploaded to the detecting peer;

means for transmitting from the detecting peer a response message to the broadcasting peer, if (a) the received unique identifier of the broadcasting peer matches the unique identifier previously uploaded to the detecting peer, and (b) the broadcasting peer has been assigned to an active state at the detecting peer;

means for determining at the broadcasting peer, upon receiving the response message from the detecting peer, to authorize a communication connection between the broadcasting peer and the detecting peer, if (a) the detecting peer is on the broadcasting peer's peer list, and (b) the detecting peer has been assigned an active state on the broadcasting peer's peer list;

means for transmitting from the broadcasting peer to the detecting peer an authorization message that authorizes the communication connection between the broadcasting peer and the detecting peer, if the communication connection is authorized;

means for establishing a communication connection between the broadcasting peer and the detecting peer; and means for communicating electronic messages between the broadcasting peer and the detecting peer;

wherein a collision avoidance protocol is employed to avoid message collisions among peers operating within the medium range distance of wireless communication.

31. Computer-executable process steps for wireless peer-to-peer communication over an unlicensed wireless communication spectrum within a medium-range distance without routing or relaying of messages, wherein the process steps are stored on a computer-readable medium, the steps comprising:

a step for assigning a unique identifier to a peer including at least a first peer and a second peer;

a step for uploading a unique identifier of the first peer to the second peer;

a step for uploading a unique identifier of the second peer to the first peer;

a step for assigning at the first peer a state of the second peer to an active state or an inactive state;

a step for assigning at the second peer a state of the first peer to an active state or an inactive state;

a step for broadcasting from a broadcasting peer its unique identifier over the unlicensed wireless communication spectrum;

a step for detecting at a detecting peer a presence of the broadcasting peer within an operating range of wireless communication by monitoring for and receiving the broadcast unique identifier signal;

a step for determining at the detecting peer whether the received unique identifier of the broadcasting peer matches a unique identifier previously uploaded to the detecting peer;

a step for transmitting from the detecting peer an authorization message to the broadcasting peer that authorizes communication connection between the broadcasting peer and the detecting peer, if (a) the received unique identifier of the broadcasting peer matches the unique identifier previously uploaded to the detecting peer, and (b) the broadcasting peer has been assigned to an active state at the detecting peer;

a step for establishing a communication connection between the broadcasting peer and the detecting peer; and a step for communicating electronic messages between the broadcasting peer and the detecting peer.

32. Computer-executable process steps for wireless peer-to-peer communication over an unlicensed wireless communication spectrum within a medium-range distance without routing or relaying of messages, wherein the process steps are stored on a computer-readable medium, the steps comprising:

a step for assigning a unique identifier to a peer including at least a first peer and a second peer;

a step for uploading a unique identifier of the first peer to the second peer;

a step for uploading a unique identifier of the second peer to the first peer;

a step for assigning at the first peer a state of the second peer to an active state or an inactive state;

a step for assigning at the second peer a state of the first peer to an active state or an inactive state;

a step for broadcasting from a broadcasting peer its unique identifier over the unlicensed wireless communication spectrum;

a step for detecting at a detecting peer a presence of the broadcasting peer within an operating range of wireless communication by monitoring for and receiving the broadcast unique identifier signal;

a step for determining at the detecting peer whether the received unique identifier of the broadcasting peer matches a unique identifier previously uploaded to the detecting peer;

a step for transmitting from the detecting peer a response message to the broadcasting peer, if (a) the received unique identifier of the broadcasting peer matches the unique identifier previously uploaded to the detecting peer, and (b) the broadcasting peer has been assigned to an active state at the detecting peer;

a step for determining at the broadcasting peer, upon receiving the response message from the detecting peer, to authorize a communication connection between the broadcasting peer and the detecting peer, if (a) the detecting peer is on the broadcasting peer's peer list, and (b) the detecting peer has been assigned an active state on the broadcasting peer's peer list;

a step for transmitting from the broadcasting peer to the detecting peer an authorization message that authorizes the communication connection between the broadcasting peer and the detecting peer, if the communication connection is authorized;

a step for establishing a communication connection between the broadcasting peer and the detecting peer; and a step for communicating electronic messages between the broadcasting peer and the detecting peer.

* * * * *